United States Patent [19]
Miller et al.

[11] Patent Number: 5,639,298
[45] Date of Patent: Jun. 17, 1997

[54] MODIFIED GYPSUM COMPOSITIONS

[75] Inventors: F. MacGregor Miller, Gurnee, Ill.; Timothy Jay Roth, Allentown, Pa.; William Russell Welliver, Ship Bottom, N.J.; John Robert Brown, Valparaiso, Ind.

[73] Assignee: Air Products and Chemicals, Inc., Allentown, Pa.

[21] Appl. No.: 562,720

[22] Filed: Nov. 27, 1995

[51] Int. Cl.$^6$ .................................................... C04B 11/00
[52] U.S. Cl. .......................... 106/735; 106/670; 106/732; 106/734; 106/772; 106/781; 106/785
[58] Field of Search ..................... 106/772, 785, 106/787, 781, 732, 734, 735, 736, 670, 801

[56] References Cited

U.S. PATENT DOCUMENTS

| | | | |
|---|---|---|---|
| 814,490 | 3/1906 | Weiss | 106/772 |
| 3,885,980 | 5/1975 | Noone | 106/772 |
| 4,193,971 | 3/1980 | Kawamata et al. | 423/243.11 |
| 4,381,207 | 4/1983 | Olander et al. | 149/40 |
| 5,084,255 | 1/1992 | College et al. | 423/243.11 |

FOREIGN PATENT DOCUMENTS

| | | |
|---|---|---|
| 55-162426 | 12/1980 | Japan. |
| 58-179539 | 10/1983 | Japan. |
| 58-179558 | 10/1983 | Japan. |

*Primary Examiner*—Anthony Green
*Attorney, Agent, or Firm*—Thomas G. Ryder

[57] ABSTRACT

A set control composition and/or interground blend of materials including a calcium sulfate material and magnesium sulfate.

8 Claims, No Drawings

MODIFIED GYPSUM COMPOSITIONS

BACKGROUND OF THE INVENTION

This invention relates generally to improvement of the engineering properties of hydraulic cements and, more particularly, to set control compositions having a modified gypsum component.

It is well-known in the cement/concrete industry that cementitious materials are prepared by combining the sintered product of the oxides of calcium, silicon, iron and aluminum (commonly abbreviated C, S, F and A, respectively, in the industry) with a calcium sulfate material. Subsequent addition of water to the cement provides a workable material which hardens and gains strength as hydration proceeds to completion. Varying the proportions of the initial oxide and sulfate materials and the process conditions affects the physical properties and performance of the resulting mortar or concrete. More specifically, these properties and subsequent performance are, in large part, determined by the relative amounts of, interaction between and hydration of the sintered oxide products: tricalcium silicate, dicalcium silicate, tricalcium aluminate and tetracalcium aluminoferrite (abbreviated $C_3S$, $C_2S$, $C_3A$ and $C_4AF$, respectively, in the industry). Generally, $C_3S$ contributes to early and later compressive strengths, while the contribution of $C_2S$ is limited to later strengths. $C_3A$ contributes to early strength, but is sulfate susceptible. While $C_4AF$ is also sulfate susceptible and adds little to early strength, it does enhance later strength. It is understood that while these four oxides and their products of sintering are those basic to the preparation and function of cementitious materials, other chemical components will also be present depending upon the source and/or identity of the raw materials used.

As mentioned above, the sintered product, clinker, is finally ground with an appropriate amount of a calcium sulfate material, usually gypsum. The resulting mixture is a hydraulic cementitious material, of which portland cement is a well-known representative. The principal function of the sulfate material is to control the set time of the cement upon mixing with water and through the course of hydration. Although the final setting of most cement materials is predominately influenced by the reaction of the $C_3S$ phase, it is generally believed that the particulate surfaces of this phase can be quickly covered by hydrated reaction products, slowing additional reaction and development of early strength. In contrast, initial reaction of the aluminate phases with water is immediate and characterized by vigorous formation of crystalline hydrate. Unless aluminate hydration is moderated an undesirable flash set condition occurs. In the presence of a calcium sulfate material, among other effects, an insoluble sulfoaluminate coating forms on the particulate surfaces and slows the rate of hydration.

In contrast to flash set, false set conditions—initial, rapid rigidity—can also occur. During grinding with the clinker material, calcium sulfate dihydrate can be dehydrated to hemihydrate or soluble anhydrite forms. When the cement is mixed with water, rehydration can form an initial mass of dihydrate crystals, causing an initial rigidity, which appears to resemble actual set conditions.

False and flash set control conditions illustrate the importance of a sulfate component to a cementitious material. A set control composition should have a chemical profile which facilitates an appropriate degree and rate of hydration. Furthermore, a set control composition must be compatible with a particular cement to achieve acceptable strengths and/or related performance parameters.

It is desirable, therefore, to have an inexpensive set control composition that is compatible with various cementitious materials, which can be interground with clinker material or admixed with the ground product and that will meet or enhance the various physical, chemical and/or performance standards recognized through out the industry, both here and abroad, especially as they apply to the portland cements as specified under various ASTM, B.S., DIN and equivalent standard specifications.

SUMMARY OF THE INVENTION

The present invention is directed to set control compositions with a sulfate component modified by inclusion of magnesium sulfate in an amount of from about 0.5 to about 12 percent by weight.

Generally, the magnesium sulfate can be present in concentrations of about 1 percent by weight or greater, such as, for example about 2 or 4 percent by weight. While concentrations of up to about 12 percent by weight have been found operable, lesser quantities, such as, for example about 9 percent by weight and even about 6 or 3 percent by weight are quite effective.

One particularly economical source of magnesium sulfate that has been found effective is the solid oxidation product from oxidizing a mixture comprising carbon (particularly a hydrocarbon), sulfur and magnesium with the sulfur and magnesium in a molar ratio of sulfur to magnesium in the range of from about 1 to about 200, preferably at least about 10 or even about 25. Generally, it is not necessary to have a ratio of greater than about 100, or even about 50. Usually the combined sulfur and magnesium content of the mixture comprising carbon, sulfur and magnesium which is oxidized is in the range of from about 0.1 to about 5 percent by weight of the mixture comprising carbon, sulfur and magnesium which is oxidized and can be from as low as about 0.05 up to as high as 6 or 7 percent by weight. The magnesium component in the oxidation product, predominantly magnesium sulfate, is generally present in a weight ratio to unoxidized carbon of greater than about 5, and preferably greater than about 20, or even about 50.

Such oxidation products generally have a magnesium content, measured as elemental magnesium, of about 4 to about 12 percent by weight, preferably about 8 to about 11 percent by weight. Usually, the unoxidized carbon in the oxidation product is less than about 4 percent by weight and preferably lower, for example 2 or even 1 percent by weight. It will be understood that the lower unoxidized carbon content in the oxidation product is desired and zero is ideal. Typically, the oxidation product has a magnesium sulfate to unoxidized carbon molar ratio of greater than about 5, preferably greater than about 20 and even greater than about 50. To express it another way, the molar ratio of sulfur to magnesium in the oxidation product is less than about 10 and generally is in the range of from about 1 to about 5, or from about 1 to about 2.

It is particularly preferred to employ as the mixture comprising carbon, sulfur and magnesium which is oxidized an aqueous emulsion of naturally occurring asphalt from the Orinoco Belt of Venezuela containing from about 100 to about 1500 ppm by weight of magnesium in the form of a water-soluble magnesium salt. When employing such a material as the mixture comprising carbon, sulfur and magnesium which is oxidized, the oxidation product can be incorporated as an additive, whether interground or admixed, over a range of concentrations, for use in the preparation of a variety of cement, mortar and concrete compositions, and the like. Typically the oxidation product can be incorporated into the cement material in quantities in the range of from about 0.1 to about 7.5 or 8 percent by weight based upon the overall composition.

Another source of magnesium sulfate that can be employed in this invention comprises at least one or more of the halides, hydroxides, carbonates and sulfates of Group IA and IIA metals. Mixtures such as these can be conveniently obtained from the waste solids produced in the aqueous scrubbing of flue gases. These mixtures should be limited in the amount employed due to the fact that they contain significant quantities of halides, particularly chlorides. Accordingly, we find that limiting the concentration of such mixtures in the total cementitious composition to about 1 percent by weight keeps the halide level below that set by various specifications and standards.

Thus, such mixtures will normally comprise less than about 6, and usually less than about 5, percent by weight of the set control compositions of this invention. The lower limit is set by the quantity of magnesium it is desired to include in the set control composition or the final cementitious composition. When employed, we typically tend to use these mixtures at a level of at least about 2 percent by weight of the set control composition of this invention, and typically greater than about 3 percent by weight of the set control composition. It will be understood that these mixtures can be used alone or in conjunction with other sources of magnesium sulfate, such as the oxidation products mentioned above or magnesium sulfate, per se. A typical combination set control composition of this invention can contain from about 2 to about 4 percent by weight of the mixture with about 6 to about 3 percent by weight of the above described oxidation product.

More particularly, the present invention provides a set control composition for use in a hydraulic cement, in which the set control composition includes (1) from about 85 to about 99.9 percent by weight of a calcium sulfate material, and (2) from about 0.1 to about 15 percent by weight of a solid oxidation product of a naturally occurring asphalt from the Orinoco Belt of Venezuela which asphalt also contains from about 100 to about 1500 ppm of magnesium. In preferred embodiments, the oxidation product is obtained from the combustion of an aqueous emulsion of an asphalt from the Orinoco Belt of Venezuela in which the magnesium is present in the form of a water soluble salt. Such an emulsion is commercially-available as Orimulsion® fuel. Generally, the oxidation product is utilized in the range from about 5 to about 12 percent by weight.

As described above, the inventive set control and/or sulfate compositions have incorporated therein an oxidation product of a naturally occurring asphalt from the Orinoco Belt of Venezuela, preferably an aqueous emulsion of such asphalt. Generally and as will be well known to those skilled in the art made aware of the invention, the preparation of such an oxidation product includes contacting the asphalt material with air and/or another oxygen-containing stream, through any one of several recognized processes or variations thereof, to provide the oxidation product in addition to combustion by-products such as heat, carbon dioxide and water. The oxidation product is the solid residuals subsequently collected downstream from the point of combustion/oxidation.

The oxidation product of the present invention can be generated in such a manner as to include the introduction of one of several auxiliary processes and/or additives upstream, downstream or at the point of combustion, to meet various process or combustion requirements, relating but not limited to emission control, reduced corrosion or enhanced operability. Depending upon the nature of these processes and/or additives, the combustion residue or by-products thereof can become intimately commingled with an oxidation product described above and can be, where appropriate, considered part of, integral to, and used with the present invention.

Illustrative of an auxiliary process and/or additive is the incorporation of a flue gas clean up device—such as a wet lime-limestone scrubber—downstream from the combuster. Scrubber residues can be returned and/or reintroduced to the combustion/oxidation line at a point upstream of the final particulate separator, such that the residues are mixed with and incorporated into the oxidation product. Again, considering a scrubber process as illustrative of a number of available auxiliary processes, one skilled in the art will recognize that the identity/composition of the scrubber residues are a function of the identity of the particular scrubbing reagent, whether it be lime, limestone or a related scrubbing reagent, and the compositional components and their relative concentrations of the make-up of water used in the scrubber.

An asphalt precursor to the oxidation product of this invention is commercially available from Bitor America Corporation, Boca Raton, Fla., under the Orimulsion® trademark. Without limitation, this commercial product is currently prepared by initial injection of steam into the asphalt formation until the viscosity is reduced to a point permitting it to flow into a well bore. A primary aqueous emulsion is prepared which further reduces asphalt viscosity and facilitates handling and transportation. The primary emulsion is then broken with the water substantially removed, leaving an asphalt material with less than 2 percent water.

Alternatively, the asphalt in the formation can be dissolved or suspended in a light hydrocarbon solvent, such as for example, kerosene, and the kerosene-containing bitumen removed to the surface where separation of the bitumen and kerosene can be effected.

Fresh water is reintroduced and the asphalt is emulsified with a surfactant under strictly controlled protocols. For example, for a shear rate of 20 $s^{-1}$, a viscosity of about 450 mPas is achieved by handling the Orimulsion® at 30° C. This and comparable production methods and techniques provide an aqueous emulsion with no more than 2 percent of the droplets having a diameter higher than 80 micrometers. The Orimulsion® material is further characterized by density (~1,010 kg/$m^3$ at 15° C.), flash point (~130° C./266° F.), and concentrations of vanadium (~300 ppm), nickel (~73 ppm), magnesium (~350 ppm), carbon (~60.0 weight percent), hydrogen (~7.5 weight percent), sulfur (~2.7 weight percent), nitrogen (~0.50 weight percent) and oxygen (~0.20 weight percent).

It will be understood by those skilled in the art that the set control compositions of the present invention are not necessarily restricted by incorporation of an oxidation product of any one aqueous emulsion which contains magnesium of the type profiled above. Whereas a commercially-available Orinoco asphalt material might be described as a 30 percent aqueous emulsion prepared with a non-ionic surfactant, the compositions of the present invention can suitably comprise, consist of, or consist essentially of the oxidation product of such material and/or oxidation products of other comparably emulsified Orinoco-type asphalts. Each such oxidation product is compositionally distinguishable, characteristically contrasted, and can be practiced in conjunction with the present invention separate and apart from another. Accordingly, it should be understood that the inventive compositions, as illustratively disclosed herein, can be prepared and/or practiced in the absence of any one oxidation product and/or species which may or may not be specifically disclosed, referenced or inferred herein, the absence of which may or may not be specifically disclosed, referenced or inferred herein.

While other components, preparations, mixtures or formulations involving a naturally-occurring Orinoco-type asphalt and which contain magnesium can be used herewith, a useful source of oxidation product is available under the PCS trademark, available from Pure Air, a division of Air Products and Chemicals, Inc. of Allentown, Pa. As described above, the compositional profile of an oxidation product will reflect any process, operation and/or additive auxiliary to the asphalt and/or combustion process. However, any such oxidation product-while compositionally distinguishable, characteristically contrasted, and separately practiced—will reflect either the absolute or relative vanadium and nickel concentrations characteristic of a naturally-occurring asphalt from the Orinoco Belt of Venezuela.

Whereas various calcium sulfate materials can be used, a preferred material consists essentially of a dihydrate of calcium sulfate. Irrespective of the identity of the calcium sulfate material utilized, the set control composition can further include materials comprising a Group IIA halide, hydroxide and/or carbonate. The corresponding Group IA halides, hydroxides, sulfates and/or carbonates can also be incorporated into the composition in quantities which will not later adversely affect the structural integrity of a cement material or concrete reinforcement. Where such auxiliary, optional and/or additive materials are utilized, the oxidation product of this invention can be present in the range from about 4 to about 9 percent by weight.

In part, the present invention is an interground blend of materials including (1) a clinker material, and (2) a set control material containing from about 85 to about 99.9 percent by weight of a calcium sulfate composition, and about 0.1 to about 15 percent by weight of a solid oxidation product of an aqueous emulsion of a naturally occurring asphalt from the Orinoco Belt of Venezuela, which aqueous emulsion includes from about 100 to about 1500 ppm of magnesium in the form of a water-soluble salt of magnesium. Likewise, as described more fully above, a preferred oxidation product is obtained from the combustion of an aqueous emulsion of the naturally occurring Orinoco Belt asphalt, such as Orimulsion® fuel which contains magnesium, and can be utilized in concentrations ranging from about 5 to about 12 percent by weight. Irrespective of the source and concentration of the inventive oxidation product, a preferred calcium sulfate composition is a dihydrate.

The interground blend of the present invention preferably has chemical and physical properties meeting ASTM C 150 standard specifications for portland cement, or C 595 and/or C 1157 standard specifications for blended cements. However, interground blends prepared in accordance with this invention can also have chemical and physical properties equivalent to ASTM C 150 standard specifications for portland cement and/or C 1157 standard specifications for blended cements. See Tables A–G below, as discussed in a co-pending application entitled "Modified Cement and Concrete Compositions" filed contemporaneously herewith and incorporated by reference herein in its entirety.

The aforementioned chemical and physical requirements can also be met by inclusion of a material comprising a Group IIA halide, hydroxide and/or carbonate. Such materials can also include the corresponding Group IA halides, hydroxides and/or other Group IA or Group IIA compounds at concentrations below those which would bring the physical/chemical parameters outside the standard specifications or adversely affect the structural integrity of any concrete material subsequently prepared with the interground blend.

As such, where the present invention is utilized in the preparation of a cementitious concrete, the improvement in the concrete includes a set control composition of about 85 to about 99.9 percent by weight of a calcium sulfate material and about 0.1 to about 15 percent by weight of a solid combustion product of a naturally occurring asphalt from the Orinoco Belt of Venezuela which contains magnesium. In particular, the improvement in such concrete materials can usually be realized most effectively when the calcium sulfate material is a dihydrate of calcium sulfate and the oxidation product is obtained from the combustion of an aqueous emulsion of the naturally occurring Orinoco asphalt which contains magnesium, such as the commercially available Orimulsion® fuel, and utilized at a concentration of about 5 to about 12 percent by weight. Improvements in accordance with the present invention are also available by inclusion of at least one of a Group II halide, hydroxide and carbonate, and/or one or more of the corresponding Group IA halides, hydroxides and carbonates, or other Group IA or Group IIA compounds.

TABLE A

ASTM C 150 Standard Chemical Requirements

| Cement Type | I and IA | II and IIA | III and IIIA | IV | V |
|---|---|---|---|---|---|
| Silicon dioxide (SiO$_2$), min, % | ... | 20.0 | ... | ... | ... |
| Aluminum oxide (Al$_2$O$_3$), max, % | ... | 6.0 | ... | ... | ... |
| Ferric oxide (Fe$_2$O$_3$), max, % | ... | 6.0 | ... | 6.5 | ... |
| Magnesium oxide (MgO), max, % | 6.0 | 6.0 | 6.0 | 6.0 | 6.0 |
| Sulfur trioxide (SO$_3$), max, % | | | | | |
| When (C$_3$A) is 8% or less | 3.0 | 3.0 | 3.5 | 2.3 | 2.3 |
| When (C$_3$A) is more than 8% | 3.5 | N/A | 4.5 | N/A | N/A |
| Loss on ignition, max, % | 3.0 | 3.0 | 3.0 | 2.5 | 3.0 |
| Insoluble residue, max, % | 0.75 | 0.75 | 0.75 | 0.75 | 0.75 |
| Tricalcium silicate (C$_3$S) max, % | ... | ... | ... | 35 | ... |
| Dicalcium silicate (C$_2$S) min, % | ... | ... | ... | 40 | ... |
| Tricalcium aluminate (C$_3$A) max, % | ... | 8 | 15 | 7 | 5 |
| Tetracalcium aluminoferrite plus twice the tricalcium aluminate (C$_4$AF + 2(C$_3$A)), or solid solution (C$_4$AF + C$_2$F), as applicable, max, % | ... | ... | ... | ... | 25 |

When expressing compounds, C=CaO, S=SiO$_2$, A=Al$_2$O$_3$, F=Fe$_2$O$_3$. For example, C$_3$A=3CaO.Al$_2$O$_3$.

There are cases where optimum SO$_3$ (using Test Method C 563) for a particular cement is close to or in excess of the limit in this specification. In such cases where properties of a cement can be improved by exceeding the SO$_3$ limits stated in this table, it is permissible to exceed the values in the table, provided it has been demonstrated by Test Method C 1038 that the cement with the increased $SO_3$ will not develop expansion in water exceeding 0.020% at 14 days. When the manufacturer supplies cement under this provision, he shall, upon request, supply supporting data to the purchaser.

The expression of chemical limitations by means of calculated assumed compounds does not necessarily mean that the oxides are actually or entirely present as such compounds.

Titanium dioxide and phosphorus pentoxide ($TiO_2$ and $P_2O_5$) shall be included with the $Al_2O_3$ content. The value historically and traditionally used for $Al_2O_3$ in calculating potential compounds for specification purposes is the ammonium hydroxide group minus ferric oxide ($R_2O_3$—$Fe_2O_3$) as obtained by classical wet chemical methods. This procedure includes as $Al_2O_3$ the $TiO_2$, $P_2O_5$ and other trace oxides which precipitate with the ammonium hydroxide group in the classical wet chemical methods. Many modern instrumental methods of cement analysis determine aluminum or aluminum oxide directly without the minor and trace oxides included by the classical method. Consequently, for consistency and to provide comparability with historic data and among various analytical methods, when calculating potential compounds for specification purposes, those using methods which determine Al or $Al_2O_3$ directly should add to the determined $Al_2O_3$ weight quantities of $P_2O_5$, $TiO_2$ and any other oxide except $Fe_2O_3$ which would precipitate with the ammonium hydroxide group when analyzed by the classical method and which is present in an amount of 0.05 weight % or greater. The weight percent of minor or trace oxides to be added to $Al_2O_3$ by those using direct methods may be obtained by actual analysis of those oxides in the sample being tested or estimated from historical data on those oxides on cements from the same source, provided that the estimated values are identified as such.

When the ratio of percentages of aluminum oxide to ferric oxide is 0.64 or more, the percentages of tricalcium silicate, dicalcium silicate, tricalcium aluminate, and tetracalcium aluminoferrite shall be calculated from the chemical analysis as follows:

Tricalcium silicate=(4.071×% CaO)−(7.600×$SiO_2$)−6.718×% $Al_2O_3$)−1.430×% $Fe_2O_3$)−2.852×% $SO_3$)

Dicalcium silicate=(2.867×% $SiO_2$)−(0.7544×% $C_3S$)

Tricalcium aluminate=(2.650×% $Al_2O_3$)−(1.692×% $Fe_2O_3$)

Tetracalcium aluminoferrite=3.043×% $Fe_2O_3$

When the alumina-ferric oxide ratio is less than 0.64, a calcium aluminoferrite solid solution (expressed as ss ($C_4AF+C_2F$)) is formed. Contents of this solid solution and of tricalcium silicate shall be calculated by the following formulas:

ss($C_4AF+C_2F$)=(2.100×% $Al_2O_3$+(1.702×% $Fe_2O_3$)

Tricalcium silicate=(4.071×% CaO)−(7.600×% $SiO_2$)−(4.479×% $Al_2O_3$)−(2.859×% $Fe_2O_3$)−(2.852×% $SO_3$).

No tricalcium aluminate will be present in cements of this composition.

Dicalcium silicate shall be calculated as previously shown.

In the calculation of all compounds the oxides determined to the nearest 0.1% shall be used.

All values calculated as described in this note shall be reported to the nearest 1%.

For Type IV cements, $C_3S$, $C_2S$ and $C_2A$ requirements do not apply when the heat of hydration limit on Table D is specified.

For Type V cements, $C_3A$ and ($C_4AF+2(C_3A)$) requirements do not apply when the sulfate expansion limit in Table D is specified.

TABLE B

ASTM C 150 Optional Chemical Requirements

| Cement Type | I and IA | II and IIA | III and IIIA | IV | V | Remarks |
|---|---|---|---|---|---|---|
| Tricalcium aluminate ($C_3A$), max, % | ... | ... | 8 | ... | ... | for moderate sulfate resistance |
| Tricalcium aluminate ($C_3A$), max, % | ... | ... | 5 | ... | ... | for high sulfate resistance |
| Sum of tricalcium silicate and tricalcium aluminate, max, % | ... | 58 | ... | ... | ... | for moderate heat of hydration |
| Alkalies ($Na_2O + 0.658\ K_2O$), max, % | 0.60 | 0.60 | 0.60 | 0.60 | 0.60 | low-alkali cement |

When expressing compounds, C=CaO, S=$SiO_2$, A=$Al_2O_3$, F=$Fe_2O_3$. For example, $C_3A=3CaO.Al_2O_3$.

These optional requirements apply only if specifically requested. Availability should be verified. See note in Section 4.

The expression of chemical limitations by means of calculated assumed compounds does not necessarily mean that the oxides are actually or entirely present as such compounds.

When the ratio of percentages of aluminum oxide to ferric oxide is 0.64 or more, the percentages of tricalcium silicate, dicalcium silicate, tricalcium aluminate and tetracalcium aluminoferrite shall be calculated from the chemical analysis as follows:

Tricalcium silicate=(4.071×% CaO)−(7.600×% $SiO_2$)−(6.718×% $Al_2O_3$)−(1.430×$Fe_2O_3$)−(2.852×% $SO_3$)

Dicalcium silicate=(2.867×% $SiO_2$)−(0.7544×% $C_3S$)

Tricalcium aluminate=(2.650×% $Al_2O_3$)−(1.692×% $Fe_2O_3$)

Tetracalcium aluminoferrite=3.043×% $Fe_2O_3$

When the alumina-ferric oxide ratio is less than 0.64, a calcium aluminoferrite solid solution (expressed as ss ($C_4AF+C_2F$)) is formed. Contents of this solid solution and of tricalcium silicate shall be calculated by the following formulas:

ss($C_4AF+C_2F$)=(2.100×% $Al_2O_3$)+(1.702×% $Fe_2O_3$)

Tricalcium silicate=(4.071×% CaO)−(7.600×% SiO$_2$)−(4.479×% Al$_2$O$_3$)−(2.859×% Fe$_2$O$_3$)−(2.852×% SO$_3$).

No tricalcium aluminate will be present in cements of this composition.

Dicalcium silicate shall be calculated as previously shown.

In the calculation of all compounds the oxides determined to the nearest 0.1% shall be used.

All values calculated as described in this note shall be reported to the nearest 1%.

The optional limit of heat of hydration in Table D shall not be requested when the sum of C$_3$S and C$_3$A is requested.

The limit on alkalies may be specified when the cement is to be used in concrete with aggregates that may be deleteriously reactive. Reference should be made to Specification C 33 for suitable criteria of deleterious reactivity.

TABLE C

| ASTM C 150 Standard Physical Requirements | | | | |
|---|---|---|---|---|
| Cement Type | I | IA | II | IIA |
| Air content of mortar, volume %: | | | | |
| max | 12 | 22 | 12 | 22 |
| min | ... | 16 | ... | 16 |
| Fineness, specific surface, m²/kg (alternative methods): | | | | |
| Turbidimeter test, min | 160 | 160 | 160 | 260 |
| Air permeability test, min | 280 | 280 | 280 | 280 |
| Autoclave expansion, max, % | 0.80 | 0.80 | 0.80 | 0.80 |
| Strength; not less than the values shown for the ages indicated below: Compressive strength, psi (MPa): | | | | |
| 1 day | ... | ... | ... | ... |
| 3 day | 1800 (12.4) | 1450 (10.0) | 1500 (10.3) 1000 (6.9) | 1200 (8.3) 800 (5.5) |
| 7 days | 2800 (19.3) | 2250 (15.5) | 2500 (17.2) 1700 (11.7) | 2000 (13.8) 1350 (9.3) |
| 28 days | ... | ... | ... | ... |
| Time of setting (alternative methods): Gillmore test: | | | | |
| Initial set, min, not less than | 60 | 60 | 60 | 60 |
| Final set, min, not less than | 600 | 600 | 600 | 600 |
| Vicat test: | | | | |
| Time of setting, min, not less than | 45 | 45 | 45 | 45 |
| Time of setting, min, not more than | 375 | 375 | 375 | 375 |

| Cement Type | III | IIIA | IV | V |
|---|---|---|---|---|
| Air content of mortar, volume %: | | | | |
| max | 12 | 22 | 12 | 12 |
| min | ... | 16 | ... | ... |
| Fineness, specific surface, m²/kg alternative methods): | | | | |
| Turbidimeter test, min | ... | ... | 160 | 160 |
| Air permeability test, min | ... | ... | 280 | 280 |
| Autoclave expansion, max, % | 0.80 | 0.80 | 0.80 | 0.80 |
| Strength; not less than the values shown for the ages indicated below: Compressive strength, psi (MPa): | | | | |
| 1 day | 1800 (12.4) | 1450 (10.0) | ... | ... |
| 3 day | 3500 (24.1) | 2800 (19.3) | ... | 1200 (8.3) |
| 7 days | ... | ... | 1000 (6.9) | 2200 (15.2) |
| 28 days | ... | ... | 2500 (17.2) | 3000 (20.7) |
| Time of setting (alternative methods): Gillmore test: | | | | |
| Initial set, min, not less than | 60 | 60 | 60 | 60 |
| Final set, min, not less than | 600 | 600 | 600 | 600 |
| Vicat test: | | | | |
| Time of setting, min, not less than | 45 | 45 | 45 | 45 |
| Time of setting, min, not more than | 375 | 375 | 375 | 375 |

Compliance with requirements of this specification does not necessarily ensure that the desired air content will be obtained in concrete.

Either of the two alternative fineness methods may be used at the option of the testing laboratory. However, when the sample fails to meet the requirements of the air-permeability test, the turbidimeter test shall be used, and the requirements in this table for the turbidimetric method shall govern.

The strength at any specified test age shall not be less than that attained at any previous specified test age.

The purchaser should specify the type of setting-time test required. In case he does not so specify, the requirements of the Vicat test only shall govern.

The second set of 3 and 7 day strength parameters for Types II and IIA apply when the optional heat of hydration or the chemical limit on the sum of the tricalcium silicate aluminate is specified.

The time of setting is that described as initial setting time in Test Method C 191.

TABLE D

| ASTM C 150 Optional Physical Requirements | | | | |
|---|---|---|---|---|
| Cement Type | I | IA | II | IIA |
| False set, final penetration, min, % | 50 | 50 | 50 | 50 |
| Heat of hydration: | | | | |
| 7 days, max, cal/g (kJ/kg) | ... | ... | 70(290) | 70(290) |
| 28 days, max, cal/g (kJ/kg) | ... | ... | ... | ... |
| Strength, not less than the values shown: Compressive strength, psi (MPa) | | | | |
| 28 days | 4000 (27.6) | 3200 (22.1) | 4000 (27.6) 3200 (22.1) | 3200 (22.1) 2560 (17.7) |
| Sulfate expansion, 14 days, max, % | ... | ... | ... | ... |

TABLE D-continued

| Cement Type | III | IIIA | IV | V |
|---|---|---|---|---|
| False set, final penetration, min, % | 50 | 50 | 50 | 50 |
| Heat of hydration: | | | | |
| 7 days, max, cal/g (kJ/kg) | ... | ... | 60 (250) | ... |
| 28 days, max, cal/g (kJ/kg) | ... | ... | 70 (290) | ... |
| Strength, not less than the values shown: | | | | |
| Compressive strength, psi (MPa) | | | | |
| 28 days | ... | ... | ... | ... |
| Sulfate expansion, 14 days, max, % | ... | ... | ... | 0.040 |

The optional limit for the sum of the tricalcium silicate and tricalcium aluminate shall not be requested when the heat of hydration limit is requested for Types II and IIA. These strength requirements apply when either heat of hydration or the sum of tricalcium silicate and tricalcium aluminate requirements are requested.

When the heat of hydration limit is specified for Type IV cement, it shall be instead of the limits of $C_3S$, $C_2S$, and $C_3A$ listed in Table A.

When the sulfate expansion is specified, it shall be instead of the limits of $C_3A$ and $C_4AF+2\ C_3A$ listed in Table A.

TABLE E

ASTM C 595 Chemical Requirements

| Cement Type | I(SM), I(SM)-A, IS, IS-A | S, SA | I(PM), I(PM)-A, P, PA, IP, IP-A |
|---|---|---|---|
| Magnesium oxide (MgO), max, % | ... | ... | 5.0 |
| Sulfur reported as sulfate ($SO_3$), max, % | 3.0 | 4.0 | 4.0 |
| Sulfide sulfur (S), max, % | 2.0 | 2.0 | ... |
| Insoluble residue, max, % | 1.0 | 1.0 | ... |
| Loss on ignition, max, % | 3.0 | 4.0 | 5.0 |
| Water-soluble alkali, max, % | ... | 0.03 | ... |

When it has been demonstrated by Test Method C 563 that the optimum $SO_3$ exceeds a value of 0.5% less than the specification limit, an additional amount of $SO_3$ is permissible provided that, when the cement with the additional calcium sulfate is tested by Test Method C 265, the extractable calcium sulfate in the hydrated mortar at 24±¼ h, expressed as $SO_3$, does not exceed 0.50 g/L. When the manufacturer supplies cement under this provision, he will, upon request, supply supporting data to the purchaser.

TABLE F

ASTM C 595 Physical Requirements

| Cement Type | I(SM), IS, I(PM),IP | I(SM)-A, IS-A, I(PM)-A, IP-A | IS(MS) IP(MS) | IS-A(MS) IP-A(MS) |
|---|---|---|---|---|
| Fineness | (See Below) | | | |
| Autoclave expansion max, % | 0.50 | 0.50 | 0.50 | 0.50 |
| Autoclave contraction, max % | 0.20 | 0.20 | 0.20 | 0.20 |
| Time of setting, Vicat test: | | | | |
| Set, minutes, not less than | 45 | 45 | 45 | 45 |
| Set, h, not more than | 7 | 7 | 7 | 7 |
| Air content of mortar (Method C 185), volume % | 12 max | 19 ± 3 | 12 max | 19 ± 3 |
| Compressive strength, min, psi (MPa): | | | | |
| 3 days | 1800 (12.4) | 1450 (9.9) | 1500 (10.3) | 1200 (8.3) |
| 7 days | 2800 (19.3) | 2250 (15.5) | 2500 (17.2) | 2000 (13.8) |
| 28 days | 3500 (24.1) | 2800 (19.3) | 3500 (24.1) | 2800 (19.3) |
| Heat of hydration: | | | | |
| 7 days, max, cal/g (kJ/kg) | 70 (293) | 70 (293) | 70 (293) | 70 (293) |
| 28 days, max, cal/g (kJ/kg) | 80 (335) | 80 (335) | 80 (335) | 80 (335) |
| Water requirement, max weight % of cement | ... | ... | ... | ... |
| Drying shrinkage, max, % | ... | ... | ... | ... |
| Mortar expansion: | | | | |
| At age of 14 days, max, % | 0.020 | 0.020 | 0.020 | 0.020 |
| At age if 8 weeks, max, % | 0.060 | 0.060 | 0.060 | 0.060 |
| Sulfate Resistance Expansion at 180 days max, % | | | 0.10 | 0.10 |

| Cement Type | S | SA | P | PA |
|---|---|---|---|---|
| Fineness | (See below) | | | |
| Autoclave expansion max, % | 0.50 | 0.50 | 0.50 | 0.50 |

TABLE F-continued

| | | | | |
|---|---|---|---|---|
| Autoclave contraction, max % | 0.20 | 0.20 | 0.20 | 0.20 |
| Time of setting, Vicat test: | | | | |
| Set, minutes, not less than | 45 | 45 | 45 | 45 |
| Set, h, not more than | 7 | 7 | 7 | 7 |
| Air content of mortar (Method C 185), volume % | 12 max | 19 ± 3 | 12 max | 19 ± 3 |
| Compressive strength, min, psi (MPa): | | | | |
| 3 days | ... | ... | ... | ... |
| 7 days | 600 | 500 | 1500 | 1250 |
| | (4.1) | (3.4) | (10.3) | (8.6) |
| 28 days | 1500 | 1250 | 3000 | 2500 |
| | (10.3) | (8.6) | (20.7) | (17.2) |
| Heat of hydration: | | | | |
| 7 days, max, cal/g (kJ/kg) | ... | ... | 60 | 60 |
| | ... | ... | (251) | (251) |
| 28 days, max, cal/g (kJ/kg) | | | 70 | 70 |
| | | | (293) | (293) |
| Water requirement, max weight % of cement | ... | ... | 64 | 56 |
| Drying shrinkage, max, % | ... | ... | 0.15 | 0.15 |
| Mortar expansion: | | | | |
| At age of 14 days, max, % | 0.020 | 0.020 | 0.020 | 0.020 |
| At age if 8 weeks, max, % | 0.060 | 0.060 | 0.060 | 0.060 |
| Sulfate Resistance Expansion at 180 days max, % | | | | |

With regard to fineness, both amount retained when wet sieved on 45-μm (No. 325) sieve and specific surface by air permeability apparatus. cm²/g, shall be reported on all mill test reports requested under 14.4.

Time of setting refers to initial setting time in Method C 191.

Heats of hydration are applicable only when moderate (MH) or low (LH) heat of hydration is specified, in which case the strength requirements shall be 80% of the values shown in the table.

The test for mortar expansion is an optional requirement to be applied only at the purchaser's request and should not be requested unless the cement will be used with alkali-reactive aggregate.

TABLE G

| ASTM C 595 Requirements for Pozzolan for Use in Blended Cements and for Slag for Use in Slag-modified portland Cements | |
|---|---|
| Pozzolan | |
| Fineness: | |
| Amount retained when wet-sieved on 45-μm (No. 325) sieve, max, % | 20.0 |
| Alkali reactivity of pozzolan for use in Types I(PM) and I(PM)-A cements, six tests, mortar bar expansion at 91 days, max, % | 0.05 |
| Slag or pozzolan activity index: | |
| with portland cement, at 28 days, min, % | 75 |

EXAMPLES OF THE INVENTION

The following nonlimiting examples and data illustrate various aspects and features relating to the compositions and/or methods of this invention, including the utility of the inventive set control compositions, and the resulting cements, mortars and concretes.

Example 1

A specific surface (Blaine) of 350±10 m²/kg was targeted for the gypsum and/or set control materials of this example. To that effect each was ground at a temperature (230° F.) adequate to dehydrate about 50% of the gypsum or gypsum component ($CaSO_4.2H_2O$) to the hemihydrate. The actual Blaines are as shown in the following Tables.

Mixing times for all the physical tests, summarized below in the following Tables, are specified in the aforementioned ASTM methods. For the C 109 strength test, place the dry paddle and the dry bowl in the mixing position in the mixer, then introduce the materials for a batch into the bowl and mix in the following manner: 1) Place all the mixing water in the bowl. 2) Add the cement to the water; then start the mixer and mix at the slow speed (140±5 rev/min) for 30 seconds. 3) Add the entire quantity of sand slowly over a 30-sec period, while mixing at slow speed. 4) Stop the mixer, change to medium speed (285±10 rev/min), and mix for 30 sec. 5) Stop the mixer and let the mortar stand for 1½ minutes. During the first 15 sec of this interval, quickly scrape down into the batch any mortar that may have collected on the side of the bowl; then for the remainder of this interval, cover the bowl with the lid. 6) Finish by mixing for 1 min at medium speed (285±10 rev/min). 7) In any case requiring a remixing interval, any mortar adhering to the side of the bowl shall be quickly scraped down into the batch with the scraper prior to remixing.

For the C 185 Air Content Test, the mixing procedure is substantially the same as for the C 109 strength test.

For the C 191 Vicat Set Time and the C 151 Autoclave Expansion Tests, place the dry paddle and the dry bowl in the mixing position in the mixer, then introduce the materials for a batch into the bowl and mix in the following manner: 1) Place all the mixing water in the bowl. 2) Add the cement to the water and allow 30 sec for the absorption of the water. 3) Start the mixer and mix at the slow speed (140±5 rev/min) for 30 sec. 4) Stop the mixer for 15 sec and during this time scrape down into the batch any paste that may have collected on the sides of the bowl. Start the mixer at medium speed (285±10 rev/min), and mix for 1 min.

For the C 359 Mortar False Set Test,: mix at one time 600 g of cement, 300 g of graded standard sand, 300 g of 20–30 standard sand, and 180 ml of water for all cements except Types III and IIIA, for which the amount of water shall be 192 ml. The mixing shall be done in the mechanical mixer as follows: 1) Place the sand and the cement in the dry bowl, and mix the dry materials for a few seconds with the spoon. 2) Place the bowl in the mixer, set the paddle in place, and mix the dry materials for 10 sec at slow speed (140±5 rev/min). 3) With the mixer operating at slow speed, add the entire quantity of mixing water within 5 sec. Stop the mixer, quickly change to a medium speed (285±10 rev/min), and continue the mixing for 1 min, timing from the first addition of water. 4) Stop the mixer, scrape the sides of the mixing bowl with the rubber scraper, and quickly place the thermometer in the mortar. Allow it to stand undisturbed for the remainder of a 45-sec interval from the time of stopping the mixer. 5) Read the temperature, remove the thermometer, start the mixer, and mix for 15 sec at a medium speed. If the mortar temperature is not in the range from 23±1.7° C. (73.4±3° F.), discard the batch and adjust the temperature of the water or sand, or both, to give the required temperature.

Immediately after the particular mixing described for each test, 1) remove the bowl from the mixer and with a spoon, uniformly distribute a portion of the mortar into the container until the container is heaping full. Quickly and gently place each spoonful of mortar in the container. When removing the mortar from the bowl, do not remove the material pushed up on the side of the bowl by the paddle. After the container has been filled, reassembled the mixer, cover the bowl with a lid, and retain the remaining mortar for a remix test to be performed later. To compact the mortar in the container, lift the container approximately 80 mm (3 in) from the table with both hands and rap it twice against the surface of the table. 2) With the leading edge slightly raised, strike off the mortar with one stroke of the trowel along the length of the container. Then remove the excess mortar by means of a sawing motion with the straightedge of the trowel along the length of the container in a direction opposite to that used in striking off. Then, smooth the surface of the mortar with a single stroke of the trowel.

For completion of the mortar false set test, 1) after filling the container, immediately place the 10-mm plunger of the Vicat apparatus, FIG. 1 of Test Method C 187, in contact with the surface of the mortar at the midpoint of the container on the longitudinal center line. Set the movable indicator at zero. Release the plunger 3 minutes after the beginning of the wet mixing and record the initial penetration in millimeters to which the plunger has settled below the surface 10 sec after being released. Generally, the plunger will settle to the bottom of the container, and the initial penetration will, accordingly, be recorded as 50+ mm. 2) Immediately withdraw and clean the plunger. In a similar manner, determine, after moving the Vicat apparatus to the desired location, the penetrations at intervals of 5, 8, and 11 min after the beginning of mixing. Do not move the filled container until these measurements are completed. Make all penetrations along the longitudinal center line of the container. Obtain 5 and 8-min penetrations at a distance of approximately 40 mm (1½ in.) from each end of the container, respectively, and determine the 11-min penetration at a point approximately midway between the points at which the initial and 5-min penetrations were determined. 3) At the completion of the measurement of the 11-min penetration, immediately return the mortar in the container to the bowl. Start the mixer, raise the bowl into mixing position, and remix the contents of the bowl at medium speed (285±10 rev/min) for 1 min. Fill a clean container as outlined above, and determine the penetration 45 sec after completion of mixing.

In the following examples the material designated as "OP 1" was comprised totally of the oxidation product obtained from Orimulsion fuel described previously, while the material designated "OP 2" was comprised of 40 percent by weight of the mixture of Group IA and IIA solids and 60 percent by weight of the oxidation product obtained from Orimulsion fuel.

TABLE 1a

Comparative Mortar Compressive Strengths (ASTM C 109)

| Cement Type | Gypsum | Fineness, $m^2/kg$ (Blaine) | Compressive Strength, psi (days of hydration) | | | |
|---|---|---|---|---|---|---|
| | | | 1 | 3 | 7 | 28 |
| I | Control 1 | 356 | 2280 | 3820 | 4460 | 5080 |
| | Control 2 | 351 | 1640 | 3160 | 4020 | 4720 |
| | Control 3 | | 2000 | 3530 | 4760 | 6180 |
| | MgSO$_4$* | | 2250 | 3600 | 5350 | 6475 |
| | Gypsum/OP 1 | 350 | 2050 | 3380 | 4060 | 4780 |
| | Gypsum/OP 2 | | 2770 | 3700 | 4400 | 5080 |
| II | Control 1 | 358 | 1370 | 3680 | 4810 | 5650 |
| | Control 2 | 355 | 1640 | 3930 | 4900 | 5800 |
| | Gypsum/OP 1 | 362 | 1270 | 3970 | 5000 | 5430 |
| V | Control 1 | 348 | 1130 | 2920 | 3980 | 5090 |
| | Control 2 | 352 | 1350 | 3470 | 4270 | 5410 |
| | Gypsum/OP 1 | 351 | 1280 | 3880 | 4700 | 5520 |

*-MgSO4 is compared to Control 3
All others are compared to Controls 1 & 2

TABLE 1b

Relative Mortar Compressive Strengths (ASTM C 109)

| Cement Type | Gypsum | Fineness, $m^2/kg$ (Blaine) | Percent of Control | | | |
|---|---|---|---|---|---|---|
| | | | 1 | 3 | 7 | 28 |
| I | Control 1 | 356 | 100 | 100 | 100 | 100 |
| | Control 2 | 351 | 72 | 83 | 90 | 93 |
| | Control 3 | | 100 | 100 | 100 | 100 |
| | MgSO$_4$* | | 113 | 102 | 112 | 105 |
| | Gypsum/OP 1 | 350 | 90 | 88 | 91 | 94 |
| | Gypsum/OP 2 | | 121 | 97 | 99 | 100 |
| II | Control 1 | 358 | 100 | 100 | 100 | 100 |
| | Control 2 | 355 | 120 | 107 | 102 | 103 |
| | Gypsum/OP 1 | 362 | 93 | 108 | 104 | 96 |
| V | Control 1 | 348 | 100 | 100 | 100 | 100 |
| | Control 2 | 352 | 119 | 119 | 107 | 106 |
| | Gypsum/OP 1 | 351 | 113 | 133 | 118 | 108 |

*-MgSO4 is compared to Control 3
All others are compared to Controls 1 & 2

TABLE 1c

Autoclave Expansion (ASTM C 151)

| Cement Type | Gypsum | Expansion, % Length |
|---|---|---|
| I | Control 1 | 0.02 |
| | Control 2 | 0.02 |
| | Gypsum/OP 1 | 0.03 |
| II | Control 1 | −0.04 |
| | Control 2 | −0.04 |
| | Gypsum/OP 1 | −0.08 |
| V | Control 1 | −0.04 |
| | Control 2 | −0.05 |
| | Gypsum/OP 1 | −0.05 |

TABLE 1d

Motar False Set (ASTM C 359)

| Cement Type | Gypsum | mm Penetration Initial | 5-min. | 8-min. | 11-min. | Remix |
|---|---|---|---|---|---|---|
| I | Control 1 | 50 | 47 | 20 | 11 | 50 |
|  | Control 2 | 50 | 40 | 15 | 10 | 50 |
|  | Control 3 | 22 | 12 | 9 | 10 | 13 |
|  | $MgSO_4$ | 10 | 5 | 5 | 4 | 4 |
|  | Gypsum/OP 1 | 50 | 14 | 6½ | 4 | 50 |
|  | Gypsum/OP 1* | 22 | 4 | 2 | 1 | 21 |
|  | Gypsum/OP 2 | 50 | 50 | 15 | 10 | 50 |
| II | Control 1 | 50 | 50 | 45 | 45 | 50 |
|  | Control 2 | 50 | 50 | 50 | 50 | 50 |
|  | Gypsum/OP 1 | 50 | 45 | 10 | 5 | 50 |
| V | Control 1 | 50 | 50 | 44 | 5 | 50 |
|  | Control 2 | 50 | 50 | 48 | 47 | 50 |
|  | Gypsum/OP 1 | 50 | 50 | 48 | 25 | 50 |

*Ground at reduced temperature to reduce dehydration.

TABLE 1e

Time of Set, VICAT (ASTM C 191)

| Cement Type | Gypsum | Init.-Hr:Min. | Fin.-Hr:Min. |
|---|---|---|---|
| I | Control 1 | 2:16 | 4:00 |
|  | Control 2 | 2:46 | 4:45 |
|  | Control 3 | 2:46 | 4:15 |
|  | $MgSO_4$ | 2:29 | 4:15 |
|  | Gypsum/OP 1 | 2:55 | 5:00 |
|  | Gypsum/OP 2 | 2:12 | 3:45 |
| II | Control 1 | 3:05 | 4:30 |
|  | Control 2 | 2:46 | 4:30 |
|  | Gypsum/OP 1 | 4:15 | 5:45 |
| V | Control 1 | 3:00 | 5:00 |
|  | Control 2 | 3:15 | 4:45 |
|  | Gypsum/OP 1 | 4:00 | 6:30 |

TABLE 1f

Mortar Air Contents (ASTM C 185)

| Cement Type | Gypsum | % By Volume |
|---|---|---|
| I | Control 1 | 9.3 |
|  | Control 2 | 11.1 |
|  | Gypsum/OP 1 | 10 |
|  | Gypsum/OP 2 | 9.7 |
| II | Control 1 | 6.6 |
|  | Control 2 | 6.2 |
|  | Gypsum/OP 1 | 6 |
| V | Control 1 | 9.9 |
|  | Control 2 | 9.5 |
|  | Gypsum/OP 1 | 9.7 |

The mortar specimens of this example were prepared with the indicated portland cement types, as prepared from clinkers with low (<5%, Type V), intermediate (~6%, Type II) and high (>12%, Type I) levels of tricalcium aluminate, by way of illustrating the effects available through use of the set control compositions of this invention. The gypsum materials tested with each cement type are as indicated. Control 1 is commercially available natural gypsum; Control 2 is a gypsum material commercially available from Air Products and Chemicals, Inc. under the Power Chip gypsum trade designation; the gypsum material indicated as gypsum/OP 1 is about 9 weight percent oxidation product in calcium sulfate dihydrate and commercially available from Pure Air, a division of Air Products and Chemicals, Inc. under the Cement Grade Power Chip trade designation; and gypsum/OP 2 is Power Chip gypsum including about 5.4 weight percent oxidation product, which is commercially available under the PCS trademark, as described above. The concentration of magnesium sulfate, per se, utilized in these Examples was 7 percent by weight of the set control composition (equivalent to 0.35% of total cementitious material). The amount of gypsum used with each clinker/cement material was chosen to provide reasonable set control, strength development, and volume stability within the parameters of the referenced ASTM test methods. As discussed above, higher gypsum levels with corresponding increases in the oxidation product component, can be used to extend the results of this example.

The C 109 mortar strength results are provided in Table 1a and compared percentage-wise with Control 1, in Table 1b. Control 2 provided greater compressive strengths than Control 1 with Types II and V cement, but showed less strength over 28 days of hydration than Control 1 with Type I cement. Gypsum/OP 1 exhibited superior strengths with Type V mixes, was substantially equivalent to Control 1 with Type II cement, but exhibited slightly reduced strengths (compared to Control 1) with Type I cement. Gypsum/OP 2 performed well with Type I cement in mortar, with high one day strengths, but was otherwise substantially equivalent to Control 1.

Both gypsum/OP were observed to be dry, compared to Control 1. The oxidation product of this invention is somewhat hygroscopic. The high water demand causes the mortar to dry rather fast. As a result, various counteracting admixtures can be introduced, including a superplasticizer such as a naphthalene sulfonate, such admixtures are also considered to be within the scope of this invention.

Referring to Table 1c, autoclave expansions are negligible and substantially unchanged with respect to either Control 1 or Control 2. Referring to Table 1d, gypsum/OP 1 induced minor false setting conditions when used in conjunction with Type II mixes, intensified slightly the false set observed with Type I mixes, and somewhat reduced the false set conditions with the Type V mixes. The gypsum/OP 2 performed in a manner comparable to Control 1, with respect to false set. As indicated, a lower grinding temperature reduced false set, suggesting that a hemihydrate species may be influencing mortar behavior for this particular cement.

As shown in Table 1e, gypsum/OP 1 delayed setting times when used in Type I, II and V cements, but the retardation is observed to be minimal. In contrast, gypsum/OP 2 eliminated the retardation. As shown in Table 1f, cements made with the gypsum materials including inventive oxidation products exhibit air contents comparable to those with Controls 1 and 2.

Example 2

The Type I and V cements described in the previous example were analyzed for insoluble residue, according to the procedures described in ASTM C 114. The results summarized in Table 2 show that the residue problem associated with coal fly ash materials (i.e., an unacceptably high concentration of materials which can not be dissolved in either acid or alkali, usually due to the presence of aluminosilicates) is not evident with the oxidation products of this invention. In all cases the residue was well below the 0.75 weight percent limit specified by C 114.

TABLE 2

| Cement Type | Gypsum | Insol. Res. (wt. %) |
|---|---|---|
| I | Control 1 | 0.21 |
| | Control 2 | 0.36 |
| | Gypsum/OP 1 | 0.25 |
| V | Control 1 | 0.11 |
| | Control 2 | 0.08 |
| | Gypsum/OP 1 | 0.06 |

While the principles of this invention have been described in connection with specific embodiments, it should be understood clearly that these descriptions, along with the chosen tables and data therein, are made only by way of example and are not intended to limit the scope of this invention, in any manner. Other advantages and features of the invention will become apparent from the following claims, with the scope thereof determined by the reasonable equivalents, as understood by those skilled in the art.

Example 3

In part, the results of the compositions of Example 1 were extended to Type V cement in concrete. Utilizing, generally, the procedures described in Example 2 of the aforementioned co-pending application, entitled "Modified Cement and Concrete Compositions," the concrete of this example was prepared with laboratory grinds of Type V clinker and the gypsum/OP 1 material described above.

Compressive strengths were determined according to standard ASTM C 39 procedures at 1, 3, 7, 28, 56 and 90 days and compared to a control prepared with a laboratory grind of the same clinker and a commercially-available natural gypsum. The results are provided in Table 3, below.

TABLE 3

| | Compressive strength, psi (days of hydration) | | | | | |
|---|---|---|---|---|---|---|
| Concrete | 1 | 3 | 7 | 28 | 56 | 90 |
| Control | 1050 | 1930 | 2750 | 3970 | 4230 | 4610 |
| w/gypsum/OP 1 | 890 | 2190 | 2890 | 4170 | 4370 | 4580 |
| % of Control | 85 | 113 | 105 | 104 | 103 | 99 |

As summarized in Table 3, a Type V concrete prepared using an oxidation product of the type described herein was observed to have compressive strengths very comparable to, and in general exceeding, those of the control. In accordance with this invention and as described above, the results of this example can be extended to include concrete compositions prepared with other cements and set control compositions of the sort disclosed herein.

Example 4

Set control compositions and the cements and concretes in which they are employed are prepared in the manner described above, but employing the mixture of blow down solids from the aqueous scrubbing of flue gas as the source of magnesium sulfate. A typical analysis of such mixture is set forth in Table X, below.

TABLE 4

| Material | Concentration wt. % |
|---|---|
| $MgSO_4 \cdot H_2O$ | 56 |
| $Ca_2SO_4$ | 12 |
| NaCl | 11.7 |
| $Al(OH)_3$ | 7.6 |
| $Fe(OH)_3$ | 5.0 |
| $Na_2SO_4$ | 4.8 |
| KCl | 2.9 |

Several batches of set control compositions are prepared using various concentrations of the solids mixture (WES) ranging from about 2 to about 6 percent by weight and including compositions prepared using combinations of the solids mixtures together with other sources of magnesium sulfate, including blends with the above described oxidation products, in proportions ranging from about 10 to about 40 percent by weight solids mixture, with the balance being oxidation products. Similarly, the solids mixture is blended with commercial grade magnesium sulfate, with the solid mixture being present in an amount of about 10 to about 50 percent by weight of the blend.

The results obtained with these batches are equivalent to the results shown above in Examples 1 through 3.

What is claimed is:

1. An interground blend of materials, comprising:

a clinker material; and a set control material containing from about 85 to about 99.9 percent by weight of a calcium sulfate composition and about 0.1 to about 15 percent by weight of a solid oxidation product of a naturally occurring asphalt from the Orinoco Belt of Venezuela containing from about 100 to about 1500 ppm by weight magnesium sulfate.

2. The blend of claim 1 wherein the oxidation product is present in range from about 5 to about 12 percent by weight.

3. The blend of claim 2 wherein the calcium sulfate composition comprises a dihydrate of calcium sulfate.

4. The blend of claim 2 wherein the set control material further includes a material comprising at least one of a Group IA or IIA halide, hydroxide and carbonate.

5. The blend of claim 1 further including a material comprising at least one of a Group IA or IIA halide, hydroxide and carbonate.

6. In a cementitious concrete, the improvement comprising a set control composition of about 85 to about 99.9 percent by weight of a calcium sulfate material and about 0.1 to about 15 percent by weight of a solid oxidation product of a naturally occurring asphalt from the Orinoco Belt of Venezuela containing from about 100 to about 1500 ppm by weight magnesium.

7. The concrete of claim 6 wherein the calcium sulfate material consists essentially of a dihydrate of calcium sulfate, and the oxidation product is about 5 to about 12 percent by weight of an oxidation product of an aqueous emulsion of a naturally occurring asphalt from the Orinoco Belt of Venezuela containing from about 100 to about 1500 ppm of magnesium in the form of a water soluble salt.

8. The concrete of claim 6 further including a material comprising at least one of a Group IA or IIA halide, hydroxide and carbonate.

* * * * *